US008231102B2

(12) United States Patent
Loeffler et al.

(10) Patent No.: US 8,231,102 B2
(45) Date of Patent: Jul. 31, 2012

(54) FLOW-CONTROL VALVE FOR HEATING/COOLING SYSTEM

(75) Inventors: Gerhard Loeffler, Olsberg (DE); Egbert Juergens, Marsberg (DE)

(73) Assignee: F. W. Oventrop GmbH & Co. KG, Olsberg (DE)

( * ) Notice: Subject to any disclaimer, the term of this patent is extended or adjusted under 35 U.S.C. 154(b) by 384 days.

(21) Appl. No.: 12/706,000

(22) Filed: Feb. 16, 2010

(65) Prior Publication Data

US 2011/0042603 A1  Feb. 24, 2011

(30) Foreign Application Priority Data

Mar. 6, 2009 (DE) .................... 10 2009 011 506

(51) Int. Cl.
*F16K 31/02* (2006.01)
(52) U.S. Cl. ............... 251/129.07; 251/282; 137/503
(58) Field of Classification Search .................. 137/503, 137/551, 553, 556, 556.3; 251/61.2, 63, 251/63.5, 63.6, 129.07, 282, 285
See application file for complete search history.

(56) References Cited

U.S. PATENT DOCUMENTS

| | | | | |
|---|---|---|---|---|
| 2,414,629 A * | 1/1947 | Bloss | ........................ | 122/451 R |
| 3,084,901 A * | 4/1963 | Thorburn | ..................... | 251/61.4 |
| 4,250,915 A * | 2/1981 | Rikuta | .......................... | 137/501 |
| 4,944,249 A * | 7/1990 | Takeuchi et al. | ........... | 119/14.44 |
| 5,642,752 A * | 7/1997 | Yokota et al. | ................. | 137/413 |
| 5,924,672 A * | 7/1999 | Crochet et al. | ............... | 251/63.6 |
| 6,244,563 B1 * | 6/2001 | Ejiri | ............................. | 251/63.6 |
| 6,814,338 B2 * | 11/2004 | Kajitani | ....................... | 251/63.6 |
| 7,455,279 B2 * | 11/2008 | Weingarten | ................... | 251/63.6 |
| 2004/0056225 A1 * | 3/2004 | Novo et al. | ................. | 251/63.6 |

\* cited by examiner

*Primary Examiner* — Eric Keasel
*Assistant Examiner* — Umashankar Venkatesan
(74) *Attorney, Agent, or Firm* — Andrew Wilford

(57) ABSTRACT

A typical flow-control valve has a housing forming a flow passage and a valve seat. An upstream and downstream valve bodies are is engageable with the seat and form upstream and downstream restrictions. A control piston defines therein outer and inner control compartments. This control piston is coupled to the downstream valve body for joint movement therewith. High-pressure and low-pressure conduits connect the outer and inner control compartments to the flow passage upstream of the upstream restriction and to the flow passage between the upstream and downstream restrictions. A connector element or stem connected to the upstream valve body extends through the control piston and has an outer end projecting out of the housing. A pressure reliever between the control piston and the outer end exerts on the connector element a force urging the upstream valve body upstream and generally equal to a pressure differential across the upstream restriction.

8 Claims, 2 Drawing Sheets

FLOW-CONTROL VALVE FOR HEATING/COOLING SYSTEM

FIELD OF THE INVENTION

The present invention relates to a flow-control valve. More particularly this invention concerns such a valve as is used in a heating or cooling system.

BACKGROUND OF THE INVENTION

A typical flow-control valve has a housing forming a flow passage having an intake port and an outlet port and a valve seat between the ports and having a lateral hollow part. An upstream valve body is engageable with the seat and forms an upstream restriction, and a downstream valve body forms a downstream restriction downstream of the upstream restriction. A control piston in the part defines therein an outer control compartment and an inner control compartment between the outer control compartment and the seat. This control piston is coupled to the downstream valve body for joint movement therewith. A high-pressure conduit connects the outer control compartment to the flow passage upstream of the upstream restriction, and a low-pressure conduit connects the inner control compartment to the flow passage between the upstream and downstream restrictions. A connector element or stem connected to the upstream valve body extends through the control piston and has an outer end projecting out of the housing.

In flow-control valves of this type, a flow passes through the upstream restriction that is defined by the position of a upstream valve body with respect to a valve seat and then the stream passes a downstream restriction that is defined by the outer valve body that is controlled by the difference in pressure, which also engages its own or the same valve seat. This difference in pressure is hereby given by the pressures that are active upstream of and downstream of the upstream restriction.

This difference in pressure is the control variable and acts upon a diaphragm that is connected to the downstream valve body. This diaphragm unit is displaceable so that the downstream valve body changes the downstream restriction in such a way that the difference in pressure across the upstream restriction remains constant and thus also the volume flow.

So that this displacement remains independent of differential pressure fluctuations via the downstream valve body, the pressure that is present downstream of the upstream restriction acts upon the inlet side as well as upon the downstream side that is directed toward the diaphragm unit of the downstream valve body, whereby both sides are separated from each other by a seal and the pressure is conveyed through passages of the diaphragm unit correspondingly to the downstream side. If the operating conditions in the heating or cooling system change, the volume flow be adapted, for which then the upstream restriction and thus the position of the upstream valve body is to be changed. This takes place, for example, manually or by motorized adjustment devices that are connected with the upstream valve body. Such a flow-control valve is known, for example, from DE 4,416,154.

To manage large volume flows with flow-control valves, the operating forces for changing the position of the upstream valve body increase so that manual actuation is more difficult or no longer possible at all. In motorized adjustment devices, correspondingly, very powerful adjustment mechanisms are required.

OBJECTS OF THE INVENTION

It is therefore an object of the present invention to provide an improved flow-control valve.

Another object is the provision of such an improved flow-control valve that overcomes the above-given disadvantages, in particular in which operating forces are held low, so that the valve can be adjusted in a simple manner manually or with an actuator or motor of limited power.

SUMMARY OF THE INVENTION

A typical flow-control valve has a housing forming a flow passage having an intake port and an outlet port and a valve seat between the ports and having a lateral hollow part. An upstream valve body is engageable with the seat and forms an upstream restriction, and a downstream valve body forms a downstream restriction downstream of the upstream restriction. A control piston in the part defines therein an outer control compartment and an inner control compartment between the outer control compartment and the seat. This control piston is coupled to the downstream valve body for joint movement therewith. A high-pressure conduit connects the outer control compartment to the flow passage upstream of the upstream restriction, and a low-pressure conduit connects the inner control compartment to the flow passage between the upstream and downstream restrictions. A connector element or stem connected to the upstream valve body extends through the control piston and has an outer end projecting out of the housing. A pressure reliever between the control piston and the outer end exerts on the connector element a force urging the upstream valve body upstream and generally equal to a pressure differential across the upstream restriction.

Very generally, the invention thereby proposes a pressure compensation, or a pressure relief, so that in the operation of the flow-control valves the forces of the pressure exerted upon the upstream valve body are compensated so that a simple and low-power adjustment of the upstream valve body is possible.

A preferred further development of this is seen therein, that the pressure-reliever consists of a cup mounted on the housing that is traversed in a sealed manner by the valve stem, the bottom of which is facing the displaceable membrane and the wall of which projects in the opposite direction. In addition a plate-like outer piston through which extends the valve stem to which it is firmly attached is axially displaceable in sealed manner to form in the cup between the outer pressure-relief piston and the bottom of the cup an inner pressure-relief compartment. This outer piston also forms toward stem outer end an outer pressure-relief compartment. The inner pressure-relief compartment is pressurized with the pressure downstream of the upstream restriction and the outer pressure-relief compartment with the pressure upstream of the upstream restriction.

According to this design, a housing part that is on the other side of the membrane and that is traversed by the valve stem has a compartment and a plate-like piston that can be displaced in it. As a result of the piston connected with the valve stem, in the housing or in the compartment, inner and outer pressure-relief compartments are formed that are respective pressurized with the pressure downstream of the upstream restriction and with the pressure upstream of the upstream restriction, so a pressure compensation is created and applied to the valve stem, as a result of which the valve body remains easily adjustable independent of the main volume flow that occurs, by acting upon the end of the stem or by a suitable drive.

Preferably, the downstream valve body is a sleeve that is traversed by the valve stem. A collar, located on the valve stem of the downstream valve body which is located close to the upstream valve body forms stream passage passages, that connect the pressure reference area between the upstream and downstream restriction with an annular passage that is formed between the valve stem and the sleeve, whereby the sleeve forms an outer annular passage together with the housing, which is connected with the inner compartment and connected with the inner annular passage by bores in the walls of the sleeve, and that the valve stem is provided with a passage in its interior that is connected by at least one bore in the stem casing with the inner annular passage, and that is connected by at least one outer bore with the inner pressure-relief compartment that is formed between the piston and the bottom of the pressure head.

As the result of this design, a very compact and functional solution is provided in order to achieve a release of pressure of the pre-adjustment.

In addition the outer pressure-relief compartment formed between piston and stem exit is connected with the outer compartment by a passage that is formed between the casing of the compartment and the housing surrounding such.

As a result of this, the compact design of the entire valve is promoted as well.

Moreover, the outer compartment is connected by a separate connection conduit or line with the inlet side of the housing passage.

The invention provides a flow-control valve in which the pressure difference generates a force upon the valve stem via the pressure-relief piston that is connected with the valve body and that acts counter to the force that results from the difference in pressure via the upstream valve body, so that the operating forces for the valve body are independent of this difference of pressure. The valve stem that is manually operated or operated by a motorized drive then only still needs to overcome friction generated by control and seal elements. Moreover, such a unit makes it possible for the release of pressure of the upstream valve body to not impair the control function of the flow-control valve by additional frictional forces with sealing elements in the diaphragm unit.

Moreover, the axial displacement of the valve stem is limited by stops, and at least one of the stops is axially adjustable. The adjustable stop according to the invention is provided as a stroke limiter at the end opposite to the valve body of the valve stopper, which can be adjusted independent of the drive type of the valve stem, also by manual actuation and/or with a motorized adjustment mechanism. In order to be able to read off the flow values corresponding with the setting of the stroke limitation, the stroke limiter is provided with a scale.

Concerning the motorized actuation of the valve stem for one, as well as the motorized stroke limitation for another, drives can be used that are designed as rotary drive or as lifting drive.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
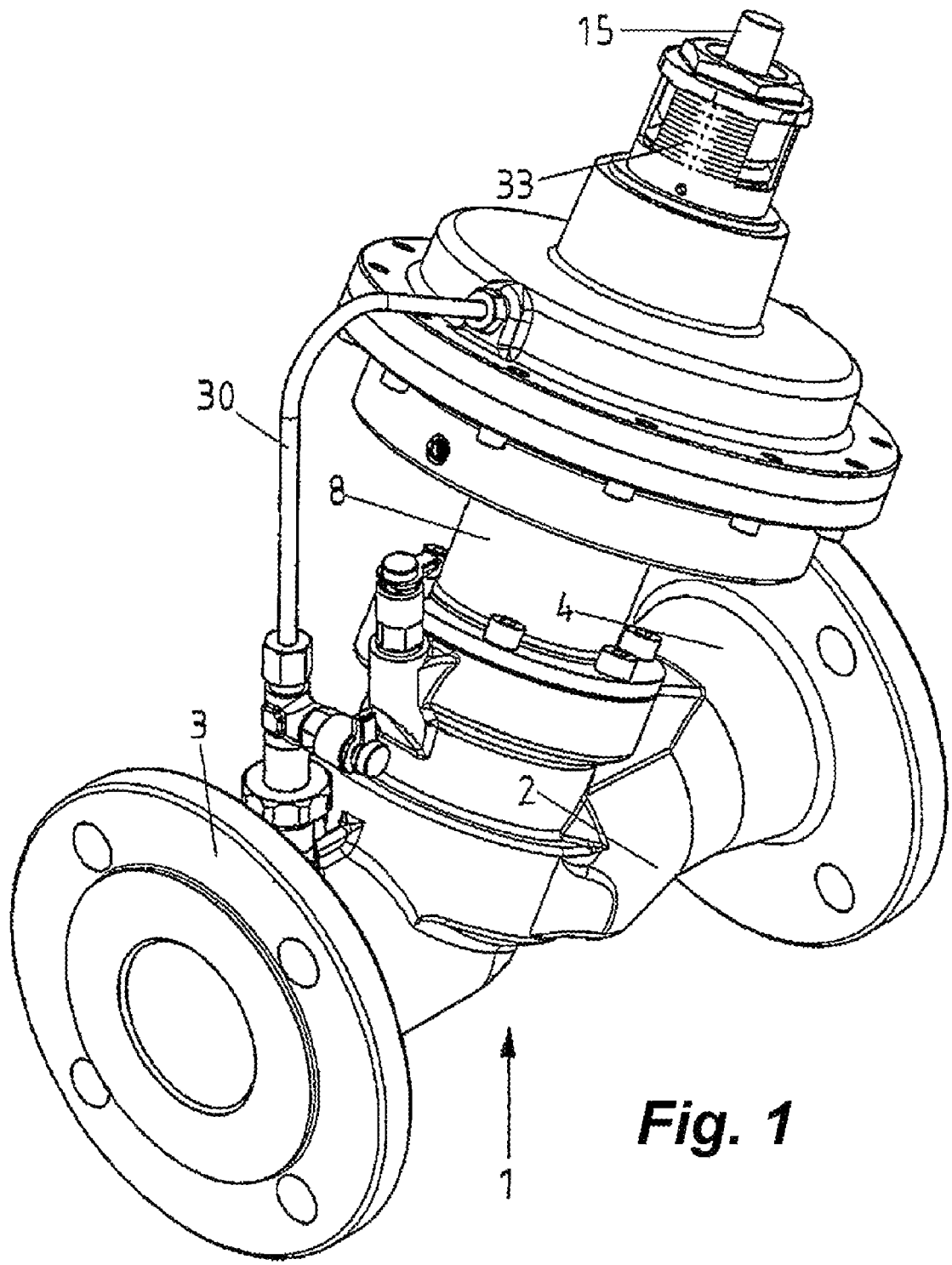
FIG. 1 is a perspective view of the valve according to the invention.
Figure 2:
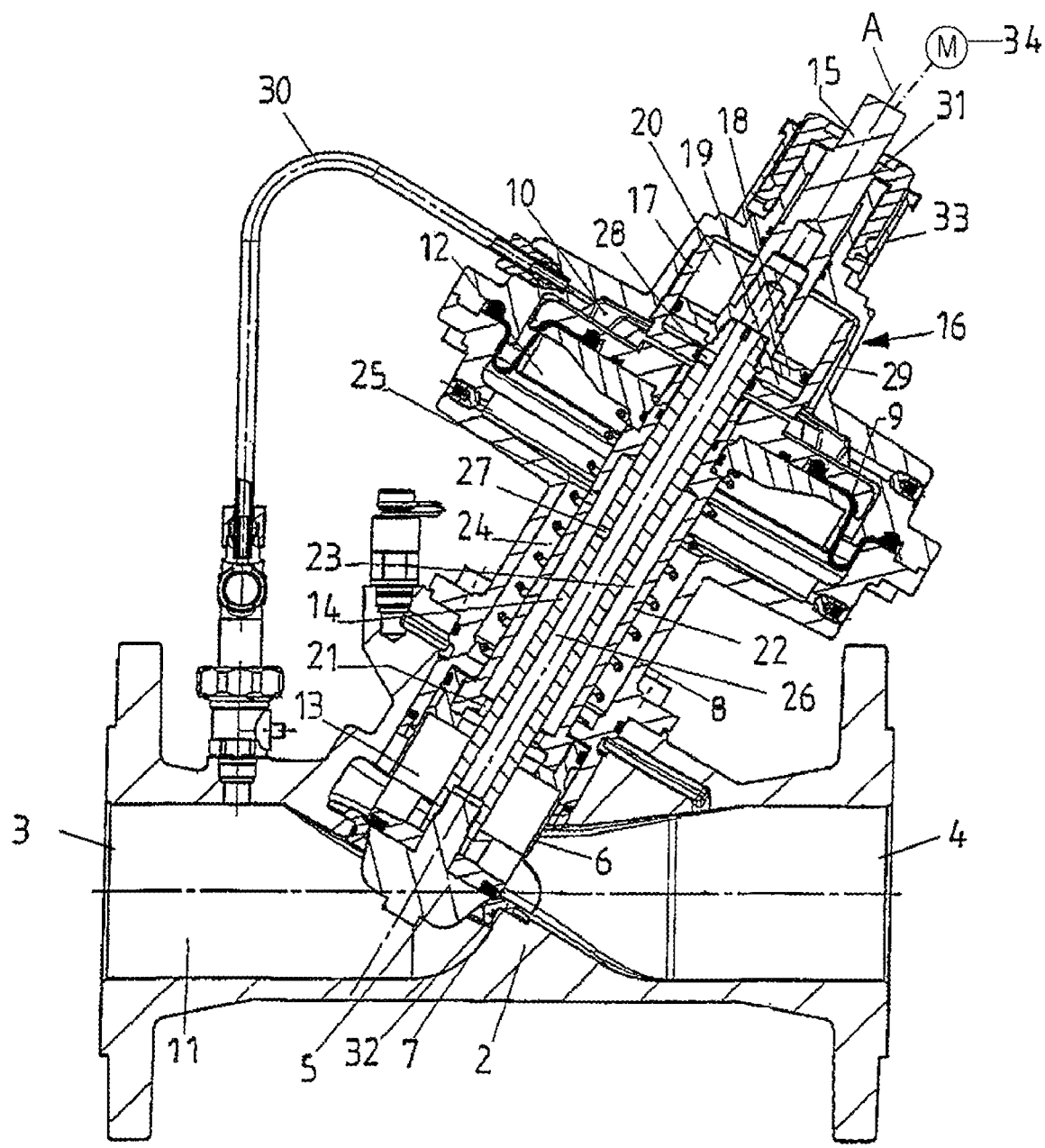
FIG. 2 is an axial vertical section through the valve.

As seen in FIGS. 1 and 2 a flow-control valve 1 for a heating or cooling system has a housing 2 with a throughgoing flow passage 11, 13 extending from an inlet side or port 3 to an outlet side or port 4 and having a central valve seat 7 forming an upstream restriction and closable by an upstream valve body 5. A downstream restriction is formed by a downstream valve body 6 that is controlled by the difference in pressure and can coact with an additional valve seat or in the illustrated an embodiment with the same valve seat 7. For controlling the differential pressure, a displaceable membrane or control piston 9 is provided in a housing part 8 unitary with and extending laterally from the housing 2 and forming two compartments 10 and 12 that are connected to the upstream and downstream parts 11 and 13 flanking the upstream restriction.

The membrane 9 is connected with the downstream valve body 8. The outer control compartment 10 is formed on the side of the membrane 9 facing away from the valve seat 7 and is connected with the upstream passage part 11 upstream of the upstream valve seat 7. The inner control compartment 12 is on the side of the membrane 9 facing the upstream valve seat 7 and is connected with the downstream passage part 13 between the upstream restriction and the downstream restriction, that is between the valve body 5 and the downstream valve body 6. The upstream valve body 5 is fixedly mounted on a valve stem 14 extending along an axis A. This stem 14 extends through the displaceable membrane 9 in a sealed manner and exits upwardly in a sealed manner out of the housing part 8. Its outer end 15 serves for manual actuation or connection to a motor or other actuator such as shown schematically at 34.

Between the displaceable membrane 9 and where the stem 14 exits the housing part 8 is a pressure-reliever 16 coupled with the stem 14 to apply thereto, by means of which a difference in pressure can be transmitted to the valve stem 14 that acts in the opposite direction as the pressure applied from the region 11 to the upstream valve body 5 at the opposite end of the stem 14.

The pressure-reliever 16 has a cup 17 that is firmly mounted on the housing and through which the stem 14 extends in a sealed manner. A planar floor of the cup 17 is toward the membrane 9 and the cylindrical cup wall projects axially therefrom toward where the stem 14 exits the part. A disk outer piston 18 is axially fixed to the stem 14, can shift axially in the cup 17, forms with the floor of the cup 17 an inner pressure-relief inner compartment 19, and forms on its outer face in the cup 17 an outer pressure-relief outer compartment 20. The inner pressure-relief inner compartment 19 is pressurized from downstream of the upstream restriction at the valve body 5 and the outer pressure-relief outer compartment 20 with the pressure upstream of the upstream restriction.

The downstream valve body 6 is a cylindrical sleeve centered on the axis A and axially slidably traversed by the stem 14. A collar of the downstream valve body 6 surrounding the valve stem 14 and close to the upstream valve body 7 forms at the stem passages or passages 21 that connect the region between the upstream and the downstream restrictions, that is between the valve bodies 5 and 6, with an inner annular passage 23 formed between the valve stem 14 and a sleeve 22 extending between the inner membrane/piston 9 and the valve body 6. This sleeve 22 with the housing part 8 an outer annular passage 24 that opens into the inner control compartment 12 and is connected by bores 25 of the sleeve 22 with the inner annular passage 23. Thus the control compartment 12 is pressurized from the interior of the sleeve-shaped valve body 6.

The valve stem 14 has a central axially extending passage 26 that communicates through least one inner bore 27 in the stem 14 with the inner annular passage 23 and through at least one outer bore 28 with the inner pressure-relief inner compartment 19 formed between the outer pressure-relief piston 18 and the bottom of the cup 17.

The outer pressure-relief compartment 20 formed on the other side of the outer piston 18 from the inner compartment 19 is connected with the outer control compartment 10 of the control piston 9 by a passage 29 formed between the outer surface of the cup 17 and the housing surrounding it. The outer control compartment 10 is connected by a separate conduit 30 with upstream passage portion 11 adjacent the inlet port 3 of the housing 2.

Axial displacement of the stem 14 is limited in the outward direction by a stop 31 and in the inward direction by a stop 32, the latter formed by the seat 7. The stop 31 can be shifted and its position read against a scale 33.

The flow-control valve 1 thus makes a pre-selection, as well as a compensation of differential pressure fluctuations possible and additionally, a pressure-relieved pre-selection.

The invention is not limited to the example of an embodiment, but within the scope of the revelation, it is greatly variable. All new individual characteristics or combinations of characteristics revealed in the description and/or in the drawing are considered to be essential to the invention

We claim:

1. A flow-control valve comprising:
   a housing forming a flow passage having an intake port and an outlet port and a valve seat between the ports and having a lateral hollow part;
   an upstream valve body engageable with the seat and forming an upstream restriction;
   a downstream valve body forming a downstream restriction downstream of the upstream restriction;
   an control piston in the part defining therein an outer control compartment and an inner control compartment between the outer control compartment and the seat, the control piston being coupled to the downstream valve body for joint movement therewith;
   a high-pressure conduit connecting the outer control compartment to the flow passage upstream of the upstream restriction;
   a low-pressure conduit connecting the inner control compartment to the flow passage between the upstream and downstream restrictions;
   a connector element connected to the upstream valve body, extending through the control piston, and having an outer end projecting out of the housing; and
   pressure-relief means between the control piston and the outer end for exerting on the connector element a force urging the upstream valve body upstream and generally equal to a pressure differential across the upstream restriction.

2. The flow-control valve defined in claim 1 wherein the pressure-relief means comprises:
   a cup axially slidably traversed by the connector element, having a floor, and having a side wall projecting along an axis of the connector element away from the valve bodies;
   a pressure-relief piston slidable in the cup and forming therein inner and outer pressure-relief compartments, the low-pressure conduit also connecting the inner pressure-relief compartment with the flow passage between the upstream and downstream restrictions, the high-pressure conduit also connecting the outer pressure-relief compartment with the flow passage upstream of the upstream restriction.

3. The flow-control valve defined in claim 2 wherein the connector element is an inner tube centered on the axis and the downstream valve body includes an outer tube coaxially spacedly surrounding the inner tube, carrying the pressure-relief piston, and forming with the inner tube an axially extending annular passage, one of the tubes being formed adjacent the downstream valve body with a collar radially slidably radially engaging the other of the tubes and formed with at least one cutout forming part of low-pressure conduit, the inner tube being formed with radially throughgoing inner and outer bores respective open into the annular passage and the inner control compartment and also forming part of the low-pressure conduit.

4. The flow-control valve defined in claim 2 wherein the side wall of the cup and the housing form an axially extending passage forming part of the high-pressure conduit.

5. The flow-control valve defined in claim 4 wherein a tube extending partially outside the housing forms part of the high-pressure conduit.

6. The flow-control valve defined in claim 1, further comprising
   inner and outer stops axially limiting movement of the upstream valve body and connector element, one of the stops being adjustable in a direction parallel to a direction of movement of the connector element and upstream valve body.

7. The flow-control valve defined in claim 6 wherein the housing carries a scale adjacent the one adjustable stop.

8. The flow-control valve defined in claim 1, further comprising a motorized drive connected to the element outer end.

* * * * *